United States Patent [19]

Tooi

[11] Patent Number: 5,448,023
[45] Date of Patent: Sep. 5, 1995

[54] TRACK BALL COORDINATE DATA INPUTTING DEVICE

[75] Inventor: Shuichi Tooi, Oyama, Japan

[73] Assignee: Mitsumi Electric Co., Ltd., Tokyo, Japan

[21] Appl. No.: 165,744

[22] Filed: Dec. 10, 1993

[30] Foreign Application Priority Data

Dec. 16, 1992 [JP] Japan .............. 4-091480 U
May 18, 1993 [JP] . Japan .............. 5-031105 U
May 18, 1993 [JP] Japan .............. 5-031106 U
May 18, 1993 [JP] Japan .............. 5-031107 U

[51] Int. Cl.⁶ .................. G08C 21/00; G09G 5/00
[52] U.S. Cl. ........................... 178/18; 345/167
[58] Field of Search .................. 345/157, 167, 168

[56] References Cited

U.S. PATENT DOCUMENTS

| | | | |
|---|---|---|---|
| 4,952,919 | 8/1990 | Nippoldt | 345/167 |
| 4,973,176 | 11/1990 | Dietrich | 345/168 |
| 5,171,978 | 12/1992 | Mimlitch et al. | 345/167 |
| 5,187,468 | 2/1993 | Ganthwaite et al. | 345/167 |
| 5,298,916 | 3/1994 | Sato et al. | 345/157 |

FOREIGN PATENT DOCUMENTS 473241 6/1992 Japan .
473242 6/1992 Japan .

*Primary Examiner*—Stephen Chin
*Assistant Examiner*—Kevin Kim
*Attorney, Agent, or Firm*—Whitham, Curtis, Whitham & McGinn

[57] ABSTRACT

A track ball coordinate data inputting device includes a coordinate data inputting ball rotatably accommodated in an accommodating portion of a frame; a pair of drivers abutted against the ball in two directions forming right angles, the drivers respectively having a rotary shaft supported at one end thereof, respectively; a pair of detecting members for detecting an amount of rotation of the ball, the detecting member including: a pair of encoders mounted near one end of the rotary shafts of the drivers, respectively; a pair of photo-sensers provided for the encoders, respectively, each photo-senser having a light emitting member and a light receiving member which are confronted with each other through the respective encoder; and a holding device for holding the other end of the rotary shafts; and an urging device for urging the other end of the rotary shafts to push the drivers against the ball.

22 Claims, 9 Drawing Sheets

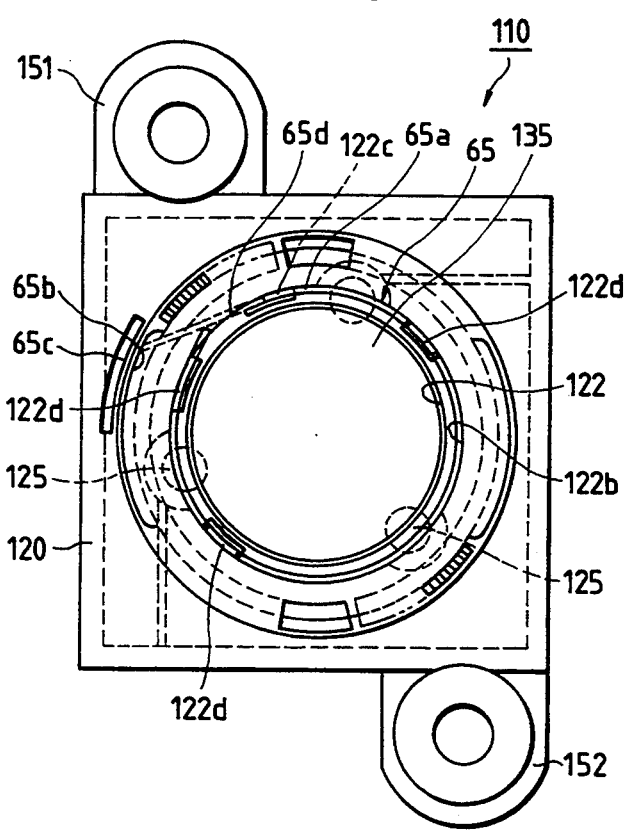
FIG. 16
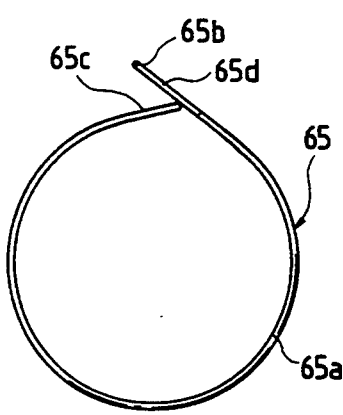
FIG. 18(A)
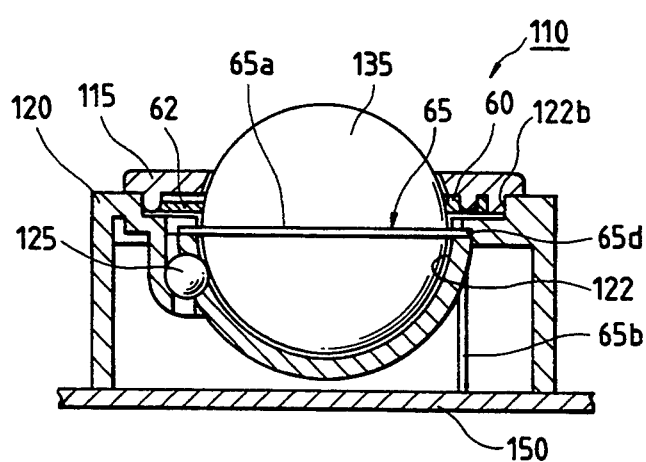
FIG. 17
FIG. 18(B)

TRACK BALL COORDINATE DATA INPUTTING DEVICE

BACKGROUND OF THE INVENTION

1. Field of the invention

This invention relates to a track ball coordinate data inputting device which is used as an external inputting device to simplify an operation of inputting or specifying data on X-Y coordinate positions, and to achieve the operation with high accuracy.

2. Related Art

A conventional track ball coordinate data inputting device is designed as shown in FIGS. 1 and 2 (hereinafter referred to merely as "a track ball unit", when applicable). That is, the track ball unit 1 includes: a coordinate data inputting ball 3 which appears partially in the upper surface of a frame 2; an annular retainer 15 detachably coupled to the frame 2 to prevent the ball 3 from coming off the frame 2; a pair of drivers 4 and 5 provided in the frame 2 in such a manner that they abut with the ball 3 in two directions forming right angles; and two detecting sections 6 and 7 adapted to detect the amount of rotation of the ball 3 as X-Y coordinate data through the drivers 4 and 5.

Those detecting sections 6 and 7 are provided in the frame 2, and connected to a printed circuit board (not shown) having a predetermined conducting pattern. On the printed circuit board are mounted, for instance, micro-switches, which are operated through push buttons on the upper lid of the frame 2, to determine or cancel coordinate positions.

The ball 3 is accommodated in an accommodating section 8a which is formed in a frame member 8 at the center in such a manner that it is circular in section and opened upwardly. In addition, in order to rotatably support the ball 3 floating in the accommodating section 8a, a plurality of supporting spherical elements 9 (five supporting spherical elements 9 in the case of FIGS. 1 and 2) are rotatably held in the spherical inner surface of the accommodating section 8 while being partially exposed.

That is, the ball 3 is not in contact with the spherical inner surface and the retainer 15; more specifically, the ball 3 is in point contact with the supporting spherical elements 9. Hence, the ball 3 can be rotated considerably readily.

With the track ball unit 1, the direction of rotation and the amount of rotation of the ball 3 are detected by the detecting sections 6 and 7 with the aid of the drivers 4 and 5. The output detection signals of the detecting sections 6 and 7 are applied through a cable or the like to a personal computer, so that the cursor is moved on the screen of the display unit of the personal computer. Under this condition, an inputting button on the frame 2 is operated to determine the position of the cursor or to cancel it.

In the track ball unit 1, the ball 3 is rotatably abutted against the drivers 4 and 5 as follows:

The pair of drivers 4 and 5 are each rotatably mounted on the upper ends of bearing parts 13 and 14 which are vertically extended from the frame member 8 of synthetic resin, and their lower end portions are swingably engaged through bearings 11a and 12a with the swing end portions of swingable levers 11 and 12.

This construction will be described with reference to the driver 5 since the drivers 4 and 5 are identical with each other. As shown in FIG. 1, a tension spring 12c is provided on one side of the lever 12. More specifically, one end of the tension spring 12c is connected to the upper end of the lever 12, and the other end is connected to the frame member 8, so that the driver 5 coupled to the swing end portion of the lever 12 is kept urged towards the ball 3 at all times.

The driver 5 is mounted on a rotary shaft 5a. An encoder 7a forming the detecting section 7 is mounted on one end of the rotary shaft 5a. The encoder 7a is in the form of a disk having a number of radial slits. Hence, the rotational displacement of the ball 3 is detected, for instance, as rotational motion in Y-coordinates.

In the above-described conventional track ball coordinate data inputting device 1, the lever 12, the driver 5, the encoder 7a, the ball 3, etc. are arranged as shown simply in FIG. 2. As is apparent from FIG. 2, the rotary shafts 12a of the lever 12 are positioned opposed to the driver 5 and the encoder 7a mounted on the rotary shaft 5a of the driver 5, so that the lever 12, the driver 5, and the encoder 7a are swung back and forth about the common axis of the bearings 12a showing an amplitude corresponding to the eccentricity of the driver 5 from the rotary shaft 5a.

The encoder 7a forming the detecting section 7 is provided farthest from the rotary shafts 12a of the lever 12; that is, it is provided at a position where the above-described swing motion is largest in amplitude. Hence, the eccentric rotation of the driver 5 affects the encoder 7a directly; that is, the encoder 7a is greatly shifted from a photosenser comprising a light emitting section and a light receiving section, which are confronted through the encoder 7a with each other. Therefore, the amount of rotation of the ball 3 is not correct when detected. That is, the conventional track ball unit is low in reliability.

In the conventional track ball unit, the pair of drivers 4 and 5 for detection of X-coordinates and Y-coordinates are individually supported and separately driven. Hence, their relevant components such as bearing means (for instance 11a and 12a) and energizing means (for instance 12c) also must be provided separately. Accordingly, the number of components concerning the drivers 4 and 5, and a space for provision of those components are increased as much, and the number of manufacturing steps is also increased. Thus, it is difficult to decrease the manufacturing cost of the conventional track ball unit or to miniaturize it.

The conventional track ball unit 1 is operated as follows: That is, it is set on a horizontal surface, and the ball is turned with the finger. If, in the track ball unit 1, the ball 3 is small and light, then the ball 3 may be shifted being floated by pressures applied thereto from the drivers 4 and 5, because as was described above the drivers 4 and 5 are kept urged towards the ball 3, and the ball 3 is spaced from the accommodating section 8a and the retainer 15.

In the case where the track ball unit 1 is set inclined; more specifically in the case where, after being set on the liquid crystal display unit of a notebook type personal computer which unit is swingable with respect to the computer body, the track ball unit is operated with the liquid crystal display unit set raised, the ball may be floated and shifted.

If the ball is floated and shifted in this manner, then the amount of rotation detected is undoubtedly low in accuracy.

When, in the above-described conventional track ball unit 1, signal processing ICs mounted on its printed circuit board 50 is electrostatically charged, for instance, through the operator's hand, the ICs may be erroneously operated or at worst broken. In order to overcome this difficulty, for instance as shown in FIG. 2, an annular copper foil 71 is bonded to the frame 2 in such a manner as to surround the ball 3, and a coil spring 72 is disposed between the copper foil 71 and the printed circuit board 50 provided below the frame 2, so that the copper foil 71 is electrically connected to the grounding part GND of the printed circuit board 50 through the coil spring 72.

In the track ball unit 1, a plurality of components (such as the copper foil 71 and the coil spring 72) are employed to eliminate the above-described electrostatic difficulty. Therefore, the track ball unit 1 is disadvantageous in that it is low in assembling efficiency, and high in manufacturing cost.

SUMMARY OF THE INVENTION

In view of the foregoing, an object of this invention is to provide a track ball coordinate data inputting device in which each of the encoders mounted on the rotary shafts of the drivers abutted against the ball is prevented from being greatly swung with respect to the light emitting section and the light receiving section; that is, it is prevented from being shifted with respect to the light emitting section and the light receiving section, whereby the amount of rotation of the ball can be detected accurately, and the number of components concerning the drivers, and accordingly the space required for provision of those components is decreased, and the number of manufacturing steps is reduced, whereby the manufacturing cost and the size can be effectively reduced.

Another object of the invention is to provide a track ball coordinate data inputting device in which, even if the ball is relatively small and light, or the device is set inclined, the ball is prevented from being floated and shifted, whereby the operability and the detecting accuracy of the device are greatly improved.

A further object of the invention is to provide a track ball coordinate data inputting device in which the components for eliminating the electrostatic effect are provided as one unit to improve the assembling efficiency and the manufacturing cost of the device.

According to a first aspect of the present invention, there is provided a track ball coordinate data inputting device comprising: a coordinate data inputting ball rotatably accommodated in a frame; a pair of drivers abutted against the ball in two directions forming right angles; and a pair of detecting sections for detecting an amount of rotation of the ball, the detecting sections comprising a pair of encoders which are mounted on the rotary shafts of the drivers, respectively, and a pair of photosensers provided for the encoders, respectively, each photosenser including a light emitting section and a light receiving section which are confronted with each other through the respective encoder wherein, the rotary shafts of the drivers are swingable to and from the ball with first ends of the rotary shafts as fulcrums, the remaining second ends of the rotary shafts are urged to push the drivers against the ball, and the encoders are mounted on the rotary shafts near the first ends.

According to a second aspect of the present invention, there is provided a track ball coordinate data inputting device comprising: a coordinate data inputting ball rotatably accommodated in a frame; a pair of drivers abutted against the ball in two directions forming right angles; and a pair of detecting sections for detecting an amount of rotation of the ball, the detecting sections including a pair of encoders which are mounted on the rotary shafts of the drivers, respectively, and a pair of photosensers provided for the encoders, respectively, each photo-sensor comprising a light emitting section and a light receiving section which are confronted with each other through the respective encoder, in which, according to the invention, the rotary shafts of the drivers are arranged substantially perpendicular to each other, and are swingable to and from the ball with the first ends of the rotary shafts as fulcrums, the encoders are mounted on the rotary shafts near the first ends, and the remaining second ends of the rotary shafts, being coupled to a pair of levers which are rotatably mounted on a common supporting shaft which is held on the frame, are urged through the levers by a single spring member to push the drivers against the ball.

Preferably in the device, the pair of levers and the spring member may be held with a flanged pin press-fitted in the common supporting shaft, or each of the levers may have semi-circular engaging grooves in the peripheral portion thereof to hold the second ends of the rotary shafts of the drivers.

According to the third aspect of the present invention, there is provided a track ball coordinate data inputting device comprising: a coordinate data inputting ball; a frame having an accommodating section for accommodating the ball; and a ring-shaped retainer detachably mounted on the frame to prevent the ball from coming off the frame, the ball being accommodated in the frame in such a manner that the ball appears partially the central opening of the retainer, an amount of rotation and a direction of rotation of the ball being utilized for detection of coordinate data, wherein a ball holder of resin is arranged between the upper periphery of the accommodating section and the lower surface of the retainer in such a manner that the ball holder is elastically abutted against the surface of the ball.

In the device, the ball holder may be made of synthetic resin such as polyester elastomer in such a manner that it has pawls along its inner periphery at a plurality of positions which abut elastically against the surface of the ball.

According to the fourth aspect of the present invention, there is provided a track ball coordinate data inputting device comprising: a coordinate data inputting ball; a frame having an accommodating section for accommodating the ball; and a ring-shaped retainer detachably mounted on the frame to prevent the ball from coming off the frame, the ball being accommodated in the frame in such a manner that the ball appears partially through the central opening of the retainer, an amount of rotation and a direction of rotation of the ball being utilized for detection of coordinate data, wherein the accommodating section has an antielectrostatic member which is formed by bending an elastic and conductive wire in such a manner that the member comprises: a ring-shaped portion which is laid along the upper periphery of the accommodating section; and a lead-out portion which is extended downwardly from the ring-shaped portion and is brought into contact with a grounding part of a printed circuit board arranged below the frame.

According to the track ball coordinate data inputting device of the present invention, the encoders are mounted on the rotary shafts of the drivers, and the rotary shafts are swingable to and from the ball with the first ends as fulcrums. Hence, the deflection of each of the encoders is minimized; that is, the encoders and the photosensers are scarcely shifted from each other. As a result, the amount of rotation of the ball is detected with high accuracy. This means that the device is high in reliability.

According to the present invention, the encoders are mounted on the rotary shafts of the drivers near the first ends, and the rotary shafts are swingable to and from the ball with the first ends as fulcrums. Therefore, even when the drivers are eccentrically turned; that is, even when the rotary shafts swing back and forth, the deflections of the encoders are minimized.

Hence, the encoders and the photosensers each including the light emitting section and the light receiving section are scarcely shifted from each other, as a result of which the amount of rotation of the ball is detected with high accuracy. This means that the device is high in reliability.

In the device, the pair of drivers are not separately set. That is, the second ends of the rotary shafts of the drivers, being coupled to the pair of levers which are rotatably mounted on the common supporting shaft held on the frame, are urged through the levers by the single spring member. Hence, both the number of components relevant to the drivers, and the space required for provision of those components can be reduced, and accordingly the number of assembling steps can be decreased. Thus, the track ball coordinate data inputting device can be manufactured at low cost, and can be miniaturized.

Furthermore, in the device, the pair of levers and the spring member are held with the flanged pin press-fitted in the common supporting shaft. Hence, in this case the assembling efficiency is higher and the manufacturing cost is lower than in the case where the levers and the spring member are held with a screw and a washer.

Each of the levers has the semi-circular engaging grooves in the periphery, which are adapted to hold the second ends of the rotary shafts of the drivers. Therefore, the levers can be coupled to the rotary shafts smoothly as follows: That is, after the rotary shafts are set in the frame, the levers can be set from above the rotary shafts thus set. The amounts of play of the rotary shafts in the direction of thrust can be absorbed by the frame. Hence, in this case, the assembling efficiency and the detecting accuracy are both higher than in the case where the levers have holes for holding the rotary shafts.

According to the present invention, the ball holder is elastically abutted against the ball, thus holding the latter at the optimum position, which is the center of the space defined by the retainer and the ball inserting opening, at all times. Hence, even if the ball is small and light, or even if the device is inclined, the ball will never be floated nor shifted. Thus, the track ball unit can be operated with high efficiency and high accuracy.

According to the present invention, the device employs the antielectrostatic member which is formed by bending an elastic and conductive wire. Hence, the device can be assembled with high efficiency, and its component cost is reduced.

BRIEF DESCRIPTION OF THE DRAWINGS

FIG. 6 is a sectional view of the device shown in FIG. 4;

FIG. 16 is a plan view of another example of the track ball coordinate data inputting device, which constitutes a fourth embodiment of the invention, particularly showing an antielectrostatic member in it;

FIG. 17 is a sectional view showing the arrangement of the antielectrostatic member in the device; and FIG. 18 (A) and (B) are a plan view and a side view, respectively, showing the antielectrostatic member in detail.

DETAILED DESCRIPTION OF THE PREFERRED EMBODIMENTS

Preferred embodiments of this invention will be described with reference to the accompanying drawings:

First Embodiment

Figure 1:
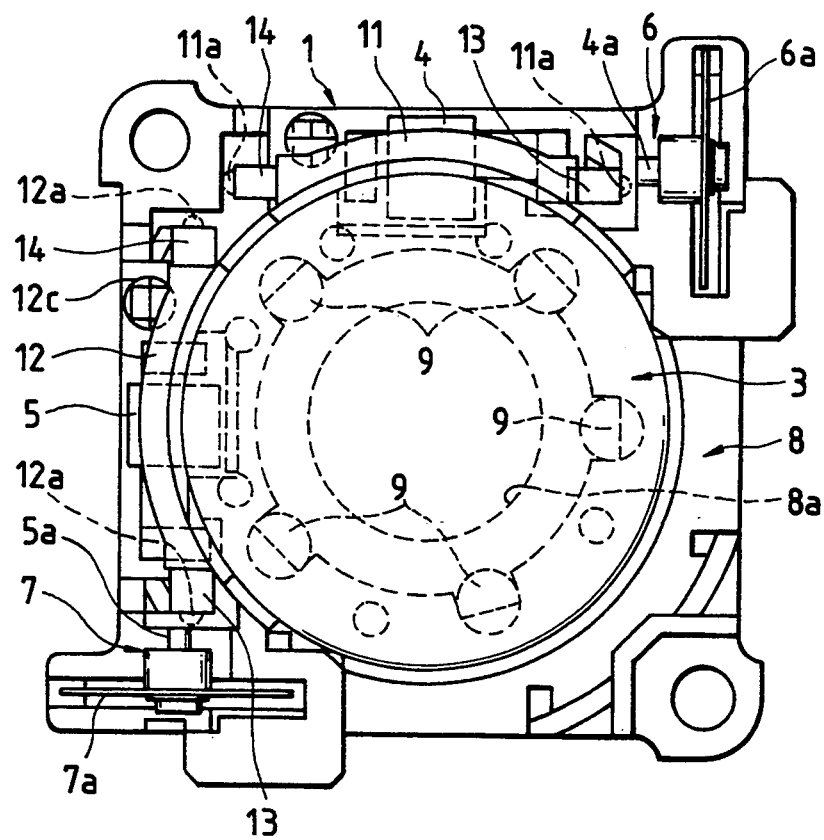
FIG. 1 is a bottom view of an example of a conventional track ball coordinate data inputting device.
Figure 2:
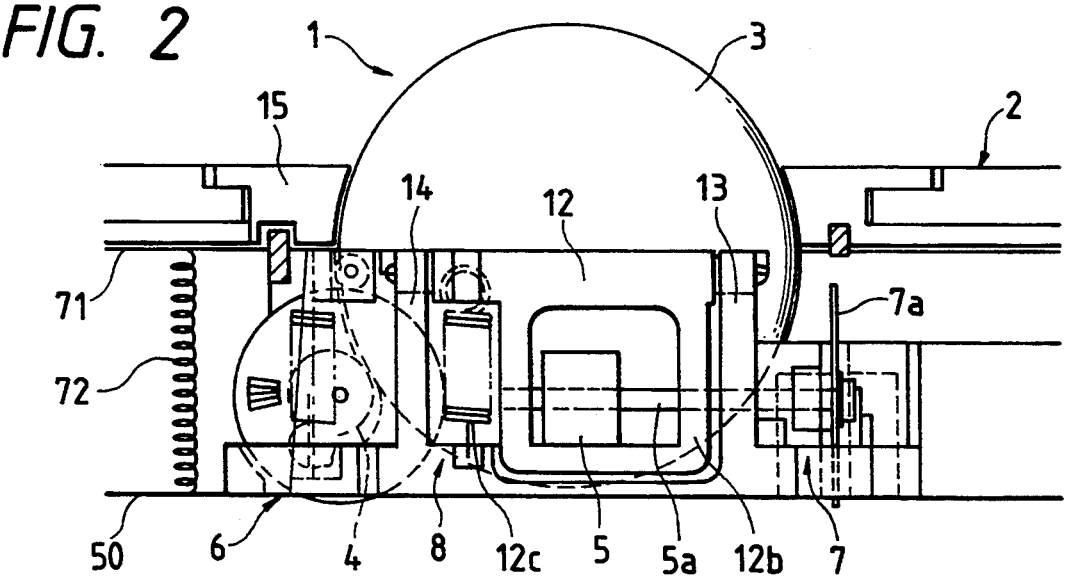
FIG. 2 is a sectional view of the device shown in FIG. 1.
Figure 3:
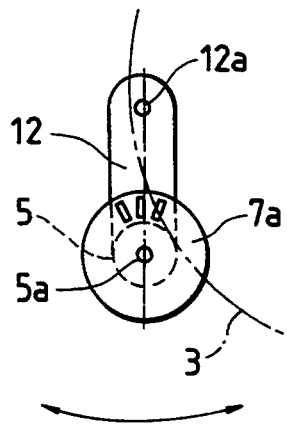
FIG. 3 is an explanatory diagram for a description of the operation of the conventional device shown in FIGS. 1 and 2.
Figure 4:
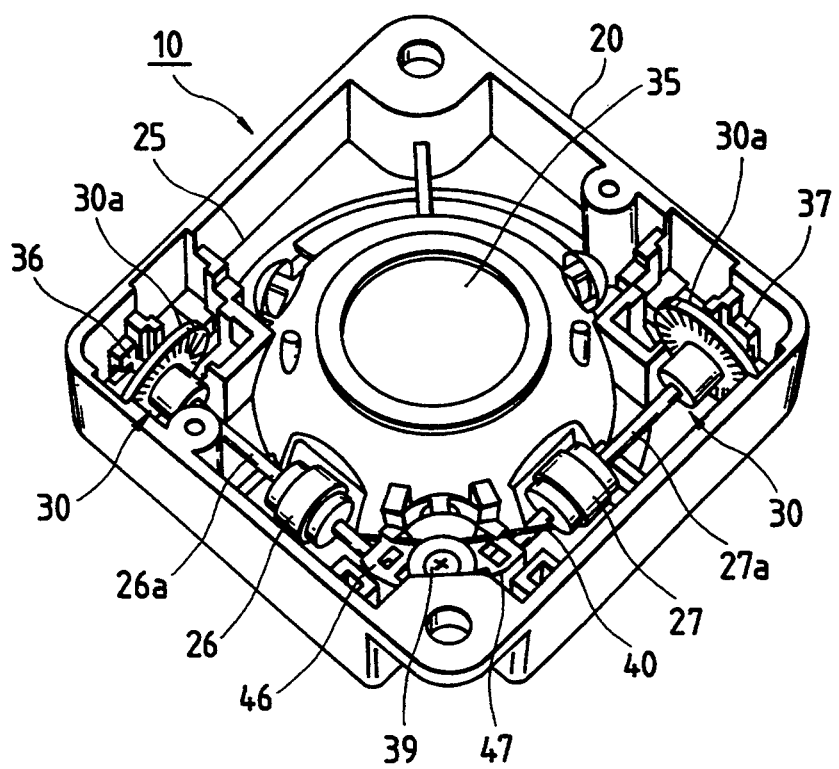
FIG. 4 is a perspective bottom view showing an example of a track ball coordinate data inputting device, which constitutes a first embodiment of the invention.
Figure 5:
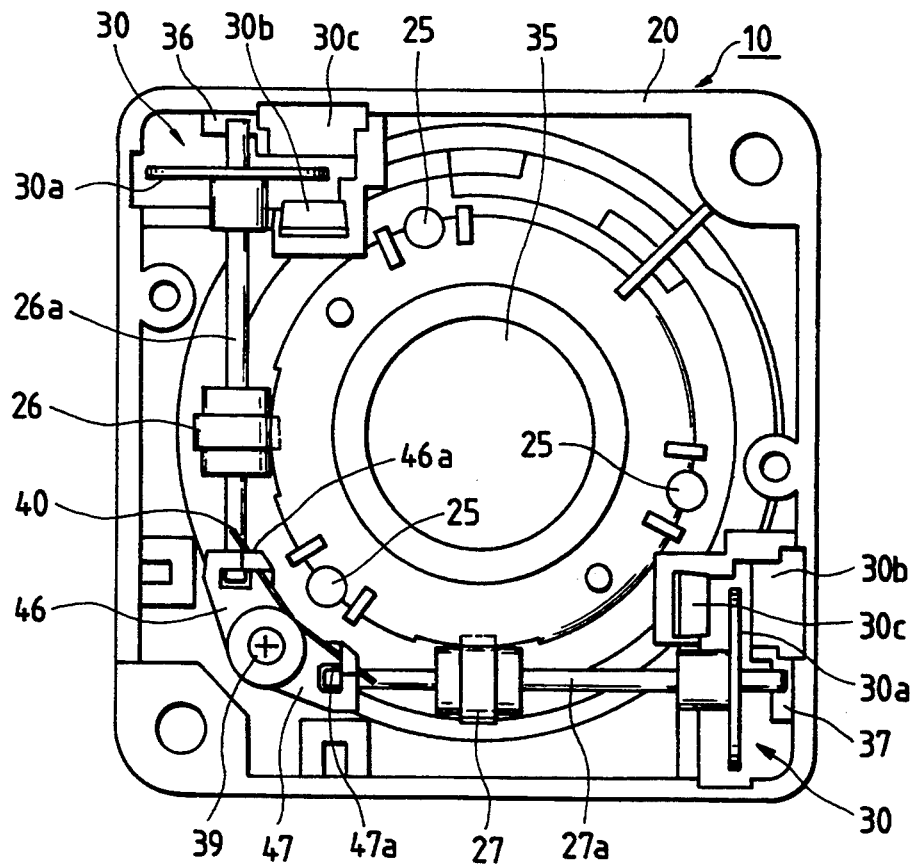
FIGS. 5 and 6 are a bottom view of the device shown in FIG. 4.
Figure 6:
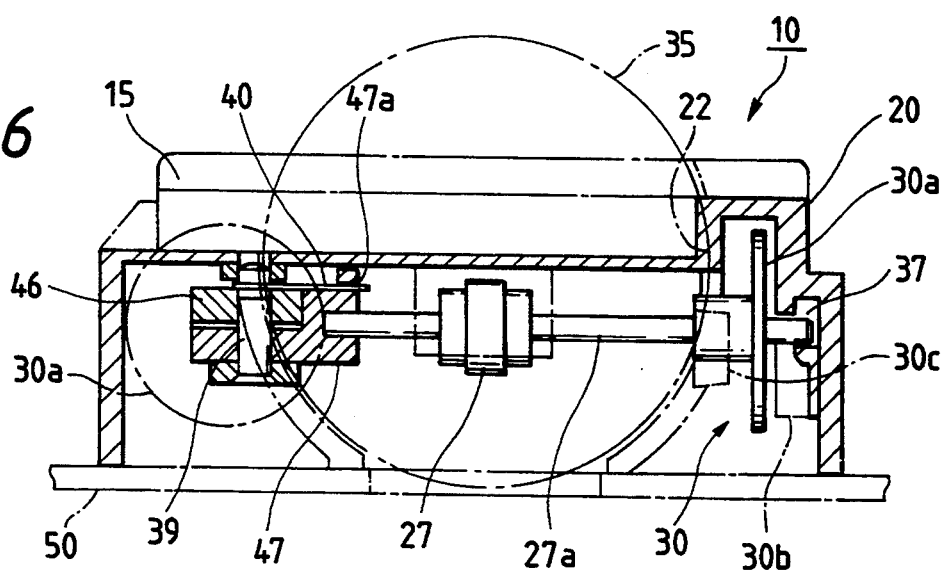

FIGS. 4, 5 and 6 are a perspective view, a bottom view, and a sectional view, respectively, showing an example of a track ball coordinate data inputting device, which constitutes a first embodiment of the invention.

As shown in those figures, the track ball coordinate data inputting device 10 (hereinafter referred to as "a track ball unit 10", when applicable) fundamentally comprises: a coordinate data inputting ball 35; a frame 20 having a semi-spherical accommodating section 22 which is opened upwardly to accommodate the ball 35; a plurality of supporting ball elements 25 adapted to rotatably support the ball 35 in the accommodating section 22; a pair of drivers 26 and 27; and a displacement detecting section 30. The supporting ball elements 25 are rotatably held in such a manner that they appear partially in the spherical inner surface of the accommodating section 22. The pair of drivers 26 and 27 are provided on the rear side of the accommodating section 22 in such a manner that they appear partially in the opening of the accommodating section 22 and abut against the ball 35 in two directions forming right angles. The displacement detecting section 30 includes: two encoders 30a which are mounted on the rotary shafts 26a and 27a of the drivers 26 and 27, respectively, and are each in the form of a disk having a number of radially extended slits; and two pairs of light emitting sections 30b and light receiving sections 30c which are provided for the encoders 30a, respectively, in such a manner that each encoder 30a is located between the light emitting section 30b and the light receiving section 30c. In FIG. 6, reference numeral 50 designates a printed circuit board having a predetermined conducting pattern.

In the embodiment, first ends of the rotary shafts 26a and 27a of the drivers 26 and 27 are loosely fitted into supporting holes 36 and 37, respectively, which are located in the upper left corner and the lower right corner of the frame 20 in FIG. 5, respectively. The remaining second ends of the rotary shafts 26a and 27a are inserted into holes 46a and 47a, which are formed in a pair of levers 46 and 47, respectively. The levers 46 and 47 are rotatably mounted on a supporting shaft 39 which is held near the lower left corner of the frame 20. A torsion coil spring 40 is wound on the supporting shaft 39, and its ends are fastened to the pair of levers 46 and 47, respectively.

That is, the rotary shafts 26a and 27a of the drivers 26 and 27 are swingable to and from the ball 35 with their first ends held in the supporting holes 36 and 37 as fulcrums, respectively, and the remaining second ends coupled to the levers 26 and 27 are urged by the coil spring 40 so that the drivers 26 and 27 are pushed against the ball 35. In this connection, it should be noted that the encoders 30a are mounted on the rotary shafts 26a and 27a near the first ends, which serve as fulcrums as was described above.

Similarly as in the conventional art, the rotary shafts 26a and 27a may be so supported as to swing back and forth like a pendulum. At any rate, the rotary shafts should be designed as follows: The rotary shafts are swingable to and from the ball with the first ends as fulcrums, and the remaining second ends are urged to push the drivers against the ball. The encoders are mounted on the rotary shafts near the first ends.

As was described above, in the track ball coordinate data inputting device 10 of the invention, the encoders 30a are mounted on the rotary shafts 26a and 27a of the drivers 26 and 27 near the first ends, and the rotary shafts 26a and 27a are swingable to and from the ball 35 with their first ends as fulcrums. Hence, even if the drivers 26 and 27 are eccentrically turned, the amounts of deflection of the encoders 30a are minimized.

Because of this structure, the encoder 30 and the photosenser comprising the light emitting section 30b and the light receiving section 30c are scarcely shifted from each other; that is, the amount of rotation of the ball 35 can be detected with high accuracy. This means that the device is high in reliability.

As is apparent from the above description, the first embodiment is so designed that the encoders mounted on the rotary shafts of the drivers, which are pushed against the ball, are not greatly deflected from the photosensers each comprising the light emitting section and the light receiving section. That is, in the first embodiment, the encoder and the photosenser are scarcely shifted from each other. Thus, the amount of rotation of the ball can be detected with high accuracy; that is, the device is high in reliability. Those effects should be highly appreciated.

Second Embodiment

Figure 7:
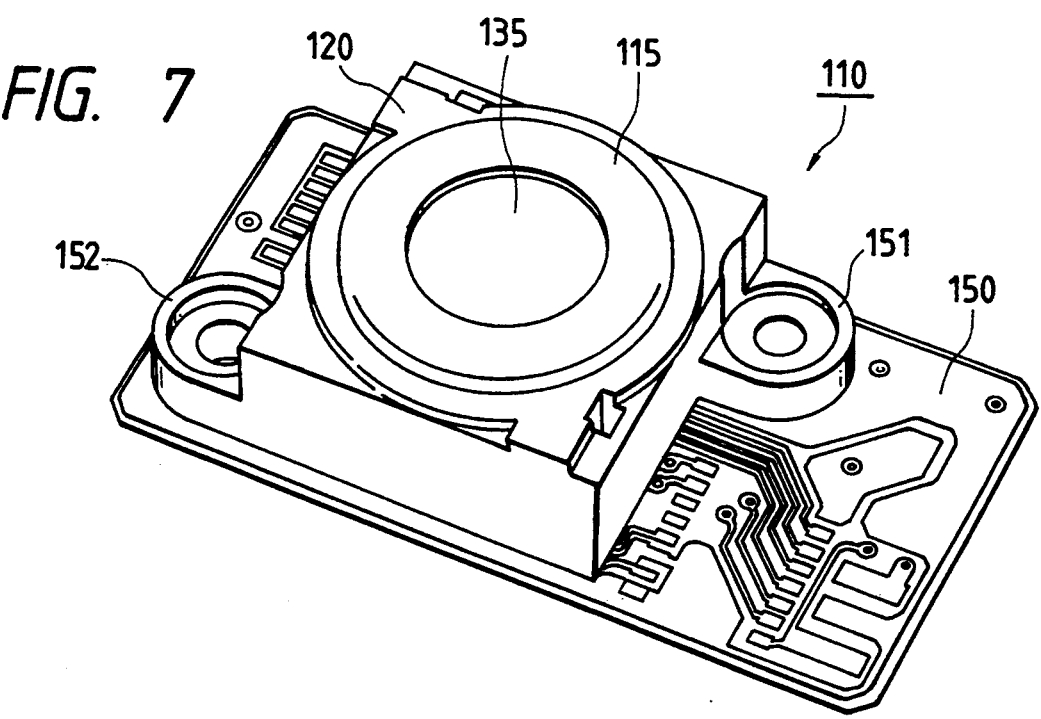
FIG. 7 is a perspective top view of another example of the track ball coordinate data inputting device, which constitutes a second embodiment of the invention.
Figure 8:
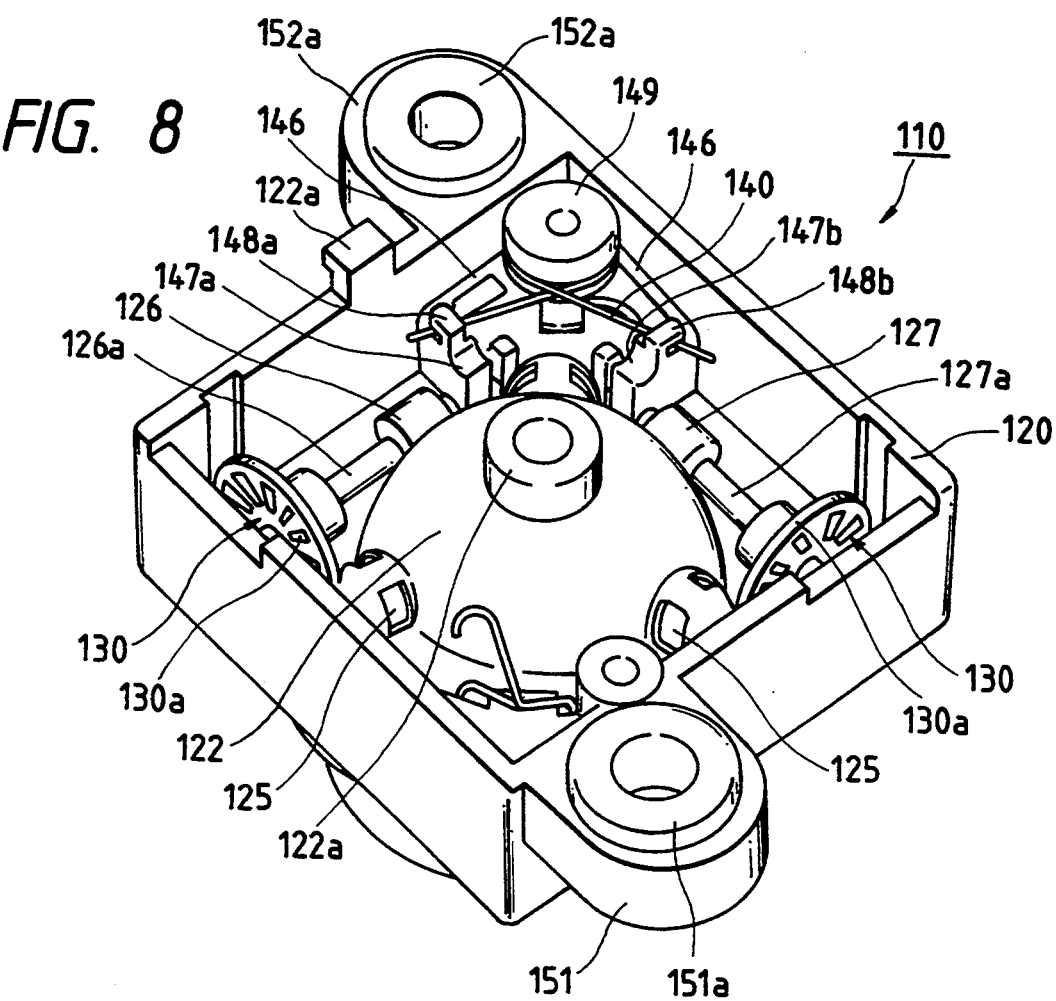
FIG. 8 is a perspective bottom view of the device shown in FIG. 7.
Figure 9:
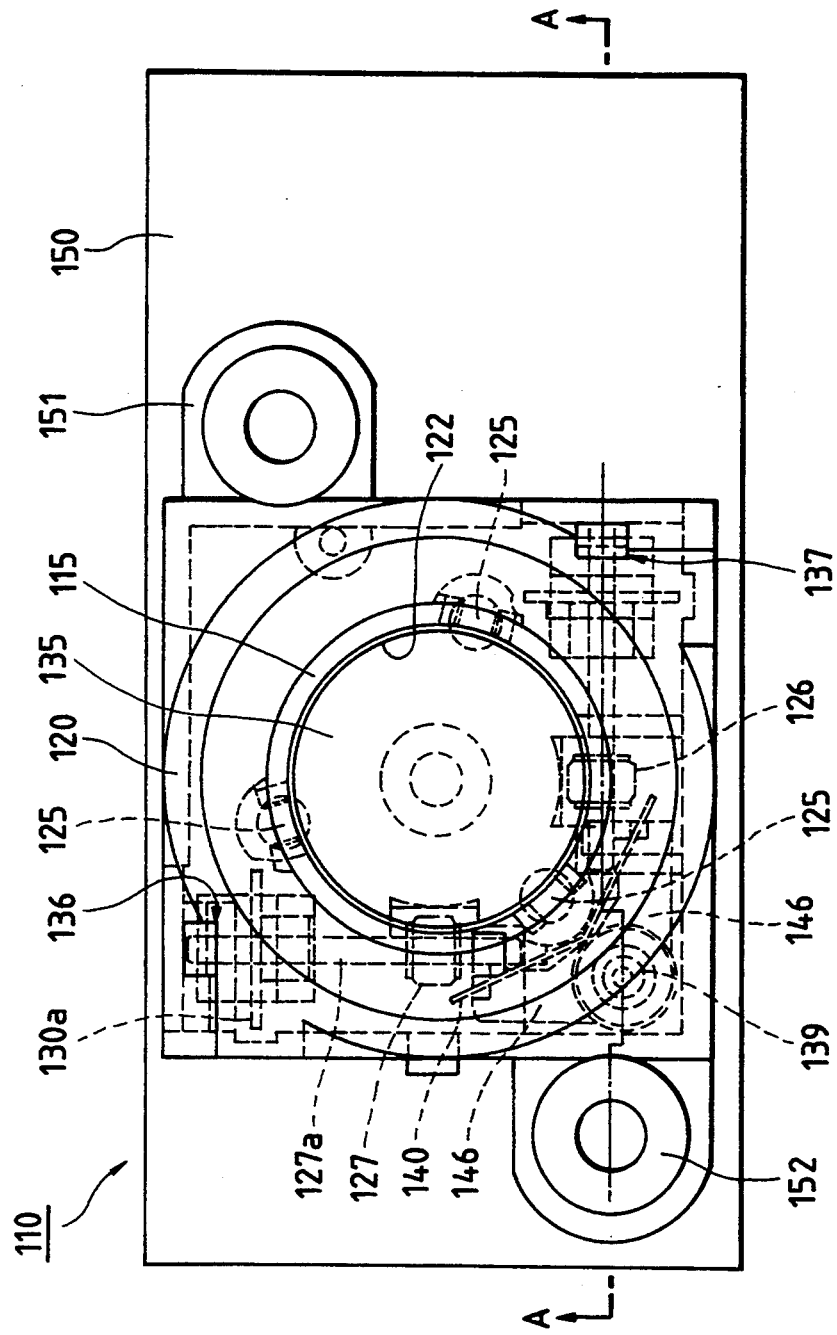
FIG. 9 is a plan view of the device shown in FIG. 7.

Another example of the track ball coordinate data inputting device, which constitutes a second embodiment of the invention, will be described with reference to FIGS. 7 through 11. FIG. 7 is a perspective view of the device, FIG. 8 is a perspective bottom view of the device with its printed circuit board removed, FIGS. 9 and 10 are a plan view and a bottom view of the device, and FIG. 11 is a sectional view taken along line A—A in FIG. 9.

The track ball coordinate data inputting device 110 (hereinafter referred to as "a track ball unit 110", when applicable) fundamentally comprises: a coordinate data inputting ball 135; a frame 120 having a semi-spherical accommodating section 122 which is opened upwardly to accommodate the ball 135; an annular retainer 115 mounted on the upper surface of the frame 120 to prevent the ball 135 from coming off; a plurality of supporting ball elements 125 adapted to rotatably support the ball 135 in the accommodating section 122; a pair of drivers 126 and 127; and a displacement detecting section 130. The supporting ball elements 125 are rotatably held in such a manner that they appear partially exposed in the spherical inner surface of the accommodating section 122. The pair of drivers 126 and 127 are provided on the rear side of the accommodating section 122 in such a manner that they appear partially in the opening of the accommodating section 122 and abut against the ball 135 in two directions forming right angles. The displacement detecting section 130 includes: a pair of encoders 130a which are mounted on the rotary shafts 126a and 127a of the drivers 126 and 127, respectively, and are each in the form of a disk having a number of radially extended slits; and two pairs of light emitting sections 130b and light receiving sections 130c which are provided for the encoders 130a, respectively, in such a manner that each encoder 130a is located between the light emitting section 130b and the light receiving section 130c. In FIGS. 7, 9 and 11, reference numeral 150 designates a printed circuit board having a predetermined conducting pattern.

The track ball unit 110 is secured to the printed circuit board 150 as follows: The frame 120 has two legs 151 and 152 on both sides, which have lower protrusions 151a and 152a, respectively. Those protrusions 151a and 152a, and a protrusion 122a provided at the lower end of the accommodating section 122 are inserted into through-holes 150a, 150b and 150c formed in the printed circuit board 150, respectively. L-shaped locking pieces 120a extended from the lower surface of the frame 120 are engaged with locking holes 150d (cf. FIGS. 10 and 11).

Figure 10:
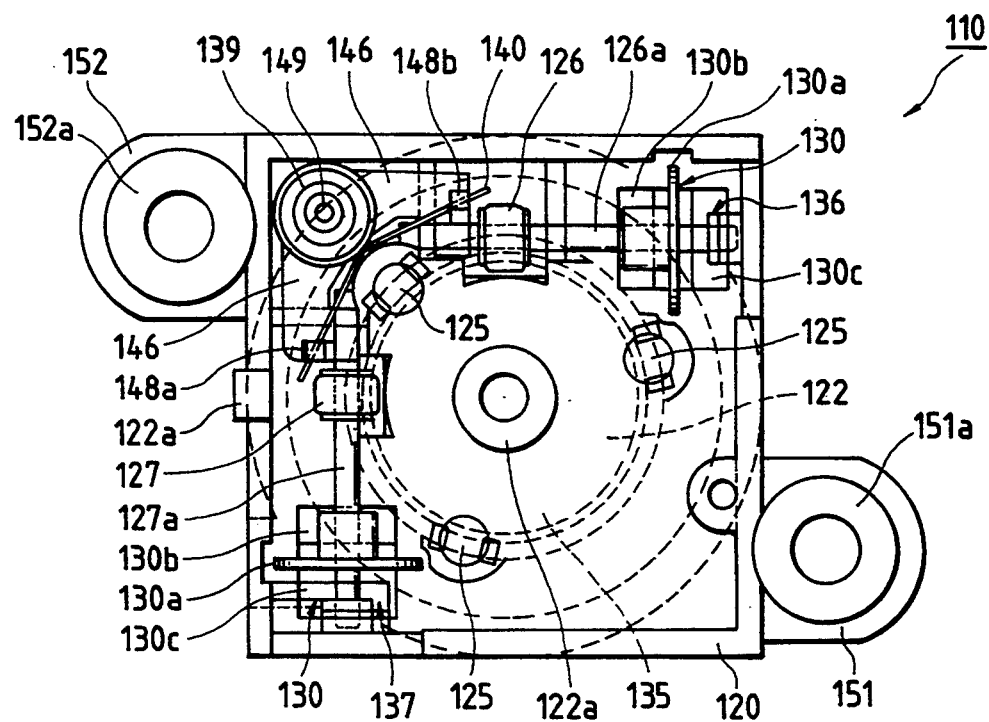
FIG. 10 is a bottom view of the device shown in FIG. 7.
Figure 11:
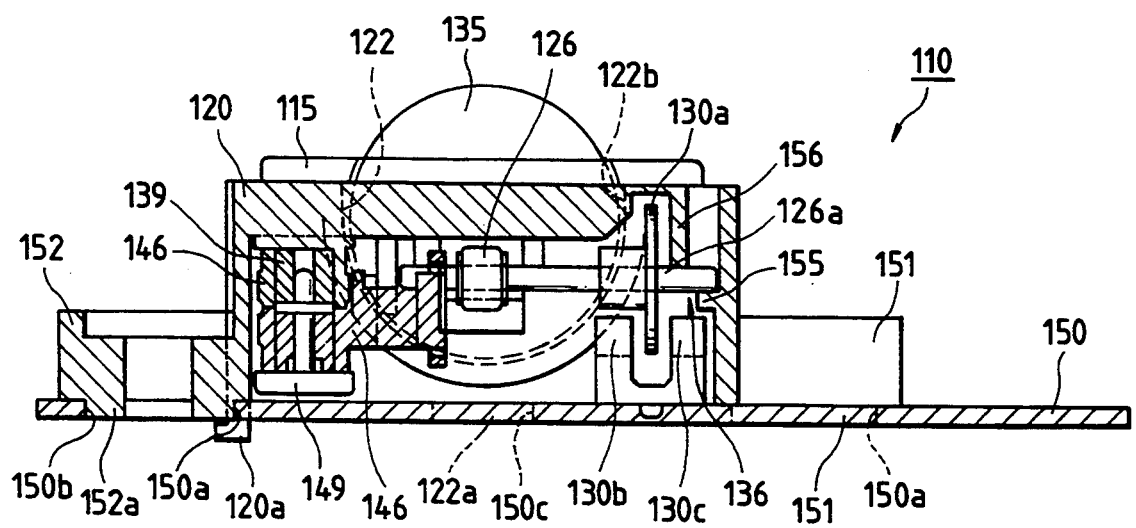
FIG. 11 is a sectional view taken along line A—A in FIG. 9.

In the second embodiment, the first ends of the rotary shafts 126a and 127a of the drivers 126 and 127 are loosely engaged with the supporting holes 136 and 136 which are formed in the upper right corner and in the lower left corner of the frame 120 in FIG. 10, respectively, and are defined by supporting protrusions 155 and pushing protrusions 156. The second ends of the rotary shafts are coupled to a pair of levers 146 and 146, which are rotatably mounted on a supporting shaft 136 held near the upper left corner of the frame 120. The levers 146 are engaged with one torsion coil spring 140, so that the drivers 126 and 127 are held elastically pushed against the ball 135 through the levers 146.

Figure 12A:
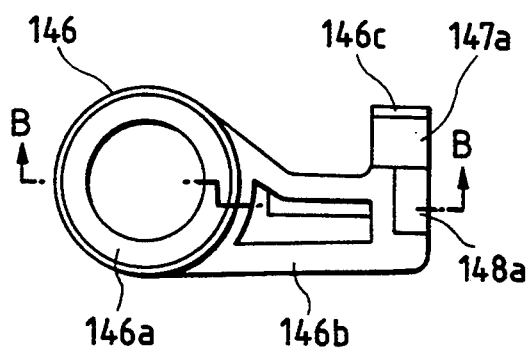
FIG. 12(A) and 12(B) are a plan view and a right side view of the lever shown in FIG. 7, respectively.
Figure 12B:
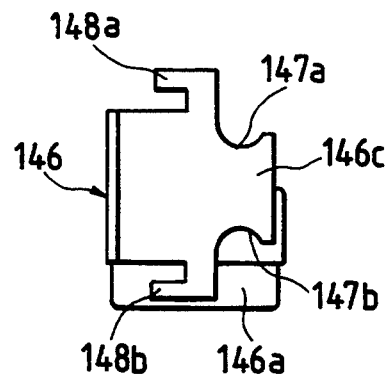
Figure 12C:
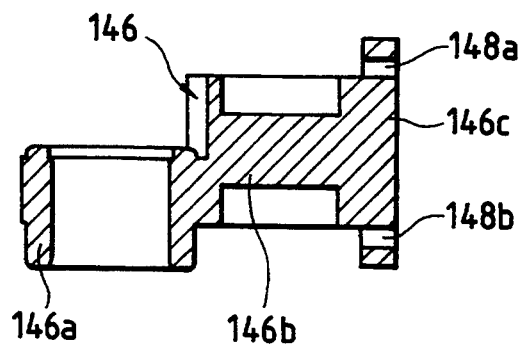
FIG. 12(C) is a sectional view taken along line B—B in FIG. 12(A)

The pair of levers 146 are similar to each other in configuration. Those levers 146 and 146 are mounted on the supporting shaft 139 in such a manner that one of the levers is set upside down, and they form right angles. The structure of the levers 146 and 146 is as shown in FIGS. 12(A) through 12(C). That is, each lever 146 comprises: a cylindrical portion 146a which is loosely engaged with the supporting shaft 139; an arm portion 146b which is extended laterally from the upper half of the cylindrical portion 146a; and an engaging portion 146c formed at the end of the arm portion 146b. The engaging portion 146c has upper and lower semi-circular engaging grooves 147a and 147b, which are used to hold the second ends of the rotary shafts 126a and 127a of the drivers 126 and 127, respectively. The engaging portion 146c further has locking pieces 148a and 148b adapted to receive both ends of the torsion coil spring 140.

The levers 146 and 146, and the torsion coil spring 140 are secured with a flanged pin 149 which is press-fitted in the common supporting shaft 139 from below.

Thus, the rotary shafts 126a and 127a of the drivers 126 and 127 are swingable to and from the ball 135 with their first ends set in the supporting holes as fulcrums, and the second ends of the rotary shafts, which are on the side of the levers 146, are urged by the torsion coil spring 140 so that the drivers 126 and 127 are kept pushed against the ball 135. It should be noted that the encoders 130a are mounted on the rotary shafts 126a and 127a near the first ends, or the swing fulcrum ends.

As was described above, in the track ball coordinate data inputting device 110 of the invention, the encoders 130a are mounted on the rotary shafts 126a and 127a of the drivers 126 and 127 near the first ends, and the rotary shafts 126a and 127a are swingable to and from the ball 35 with their first ends as fulcrums. Hence, even if the drivers 126 and 127 are eccentrically turned, the amounts of deflection of the encoders 30a are minimized.

Because of this structure, the encoder 130a and the photosenser comprising the light emitting section 130b and the light receiving section 130c are scarcely shifted from each other; that is, the amount of rotation of the ball 135 can be detected with high accuracy. This means that the device 110 is high in reliability.

In the second embodiment, the pair of drivers 126 and 127 are not separately arranged; that is, the second ends of the rotary shafts of them are coupled to the pair of levers 146 and 146 which are rotatably mounted on the common supporting shaft 139, and the second ends are urged by the torsion coil spring 140 through the levers 146 and 146. Hence, the number of components relevant to the drivers, and the space required for provision of those components, and accordingly the number of manufacturing steps can be reduced. Thus, the track ball unit 110 is low in manufacturing cost, and can be miniaturized.

In the second embodiment, the pair of levers 146 and 146, and the torsion coil spring 140 are secured with the flanged pin 149 press-fitted into the common supporting shaft 139. Hence, in this case, the assembling efficiency is higher and the manufacturing cost is lower than in the case where those components are secured with a screw and a washer. The flanged pin 149 may be made of synthetic resin similarly as in the case of the frame 20. In this case, the smoothness of the synthetic resin allows the flanged pin to be readily press-fitted into the supporting shaft 139, which contributes to improvement of the assembling efficiency and to reduction of the manufacturing cost.

Each of the levers 146 and 146 has the semi-circular engaging grooves 147a and 147b in the periphery, which are adapted to hold the second ends of the rotary shafts 126a and 127a of the drivers 126 and 127. Therefore, the levers 146 can be coupled to the rotary shafts 126a and 127a smoothly as follows: That is, after the rotary shafts 126a and 127a are set in the frame 120, the levers 146 and 146 can be set from above the rotary shafts thus set. The amounts of play of the rotary shafts 126a and 127a in the direction of thrust can be absorbed by the frame 120. Hence, in this case, the assembling efficiency and the detecting accuracy are both higher than in the case where the levers 146 have holes for holding the rotary shafts.

As is apparent from the above description, in the second embodiment, the encoders mounted on the rotary shafts of the drivers, which are pushed against the ball, are not greatly deflected from the photosensers each comprising the light emitting section and the light receiving section. That is, in the embodiment, the encoder and the photosenser are scarcely shifted from each other. Thus, the amount of rotation of the ball can be detected with high accuracy. In addition, the number of components relevant to the drivers, the space for provision of those components, and accordingly the number of manufacturing steps can be reduced. Thus, the track ball coordinate data inputting device can be manufactured at low cost, and can be miniaturized.

Third Embodiment

Another example of the track ball coordinate data inputting device, which constitutes a third embodiment of the invention, will be described with reference to FIGS. 13 through 14, in which parts corresponding functionally to those which have been described with reference to the second embodiment are therefore designated by the same reference numerals or characters.

Figure 13:
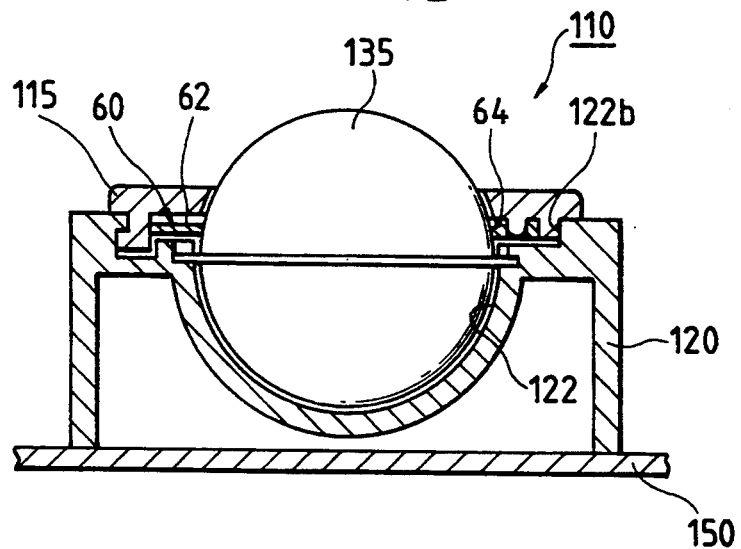
FIG. 13 is a sectional view showing another example of the track ball coordinate data inputting device, which constitutes a third embodiment of the invention.
Figure 14:
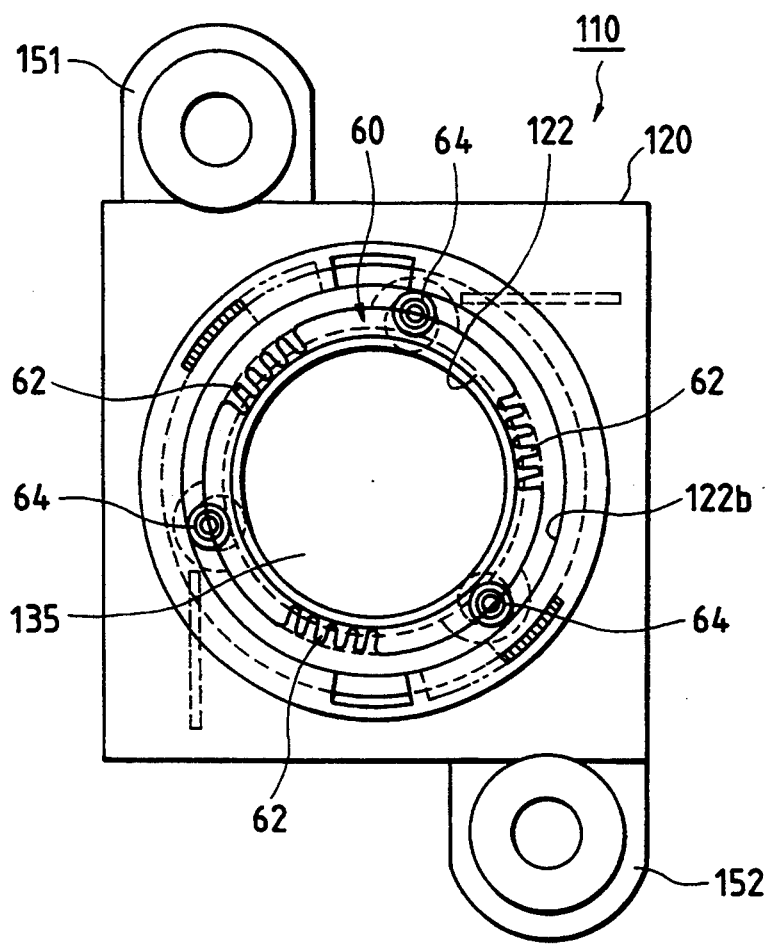
FIG. 14 is a plan view of the device shown in FIG. 13.

In the third embodiment, as shown in FIGS. 13 and 14, an annular ball holder 60 made of synthetic resin such as polyester elastomer is interposed between the upper periphery 22b of the accommodating section 122 of the frame 120 and the lower surface of the retainer 115.

Figure 15A:
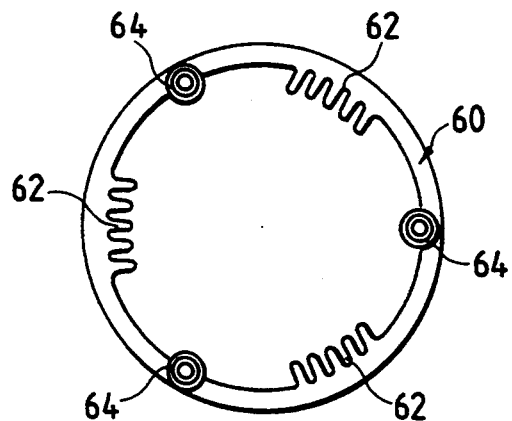
FIG. 15 (A) and (B) are a plan view and a sectional view, respectively, showing a ball holder employed in the device shown in FIG. 13.
Figure 15B:
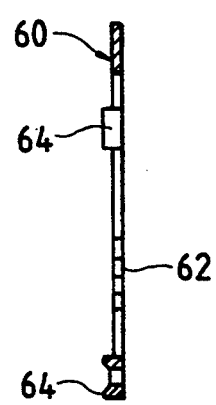

The ball holder 60, as shown in FIG. 15, has three groups of comb's-teeth-like pawls 62 which are arranged along its inner circular periphery at predetermined angular intervals (or at intervals of 120°) so that they abut elastically against the ball 135, and three protrusions 64 located between the three groups of pawls 62. Those protrusions 64 have each a certain thickness so that the ball holder is held by the lower surface of the retainer 115 under pressure.

In the track ball unit 110 thus constructed, the pawls 62 of the ball holder 60 abut elastically against the ball 135, so that the latter 135 is held at the optimum position; i.e., at the center of the space defined by the retainer or the ball inserting opening. Hence, even if the ball 135 is small and light, or even if the track ball unit is inclined, the ball will never be floated nor shifted. Thus, the track ball unit can be operated with high efficiency and with high accuracy.

The ball holder may be replaced by other means; for instance, a cushion member may be bonded to the rear surface of the retainer 115 to regulate the behavior of the ball.

As is apparent from the above description, the track ball coordinate data inputting device has the following effects or merits: Even if the ball is small and light, or the device is inclined during operation, the ball will never be floated nor shifted. Thus, the device is high in operability and in detecting accuracy.

Fourth Embodiment

An another example of the track ball coordinate data inputting device, which constitutes a fourth embodiment of the invention, will be described with reference to FIGS. 16, 17 and 18, in which parts corresponding functionally to those which have been described with reference to the second embodiment are therefore designated by the same reference numerals or characters.

In the fourth embodiment, as shown in FIGS. 16 and 17, an antielectrostatic member 65 is provided along the upper periphery 122b of the accommodating section 122 of the frame 120. The member 65, as shown in FIG. 18 in detail, is formed by bending an elastic and conductive wire.

More specifically, the antielectrostatic member 65 includes: a ring-shaped portion 65a which is laid along the upper periphery 122b of the accommodating section 122; and a lead-out portion 65b which is extended downwardly from the ring-shaped portion 65a forming an angle with the latter. The lower end portion of the lead-out portion 65b is circularly curved so as to be brought into contact with the grounding part GND of the printed circuit board 150 provided below the frame 120. The ring-shaped portion 65a is cut into two parts at the point from which the lead-out portion 65b is extended downwardly, so that the diameter of the ring-shaped portion 65a can be adjusted, or increased or decreased. Those two parts are bent L-shaped, thus providing a holding portion 65c, the end portion of which is inserted into the inserting hole provided on the upper periphery 122b of the accommodating section 122. In addition, the lead-out portion 65b is inserted into another inserting hole, thus confronting another holding portion 65d to the holding portion through the inserting/locking portion 122c of the accommodating section 122 of the frame 120. The inserting/locking portion 122c of the accommodating section 122 of the frame 120 is fixedly held with those holding portions 65c and 65d.

The holding portions 65c and 65d of the antielectrostatic member 65 hold the inserting/locking portion 122c of the accommodating section 122 of the frame 120 with the aid of the elasticity of the ring-shaped portion 65a, so that the antielectrostatic member 65 is set along the upper periphery 122b of the accommodating section 122 with the ring-shaped portion 65a exposed. The upper periphery 122b of the accommodating section 122 has three locking protrusions 122d adapted to retain the ring-shaped portion 65a.

An annular ball holder 60 is interposed between the lower surface of the retainer 115 and the upper periphery 122b of the accommodating section to prevent the ball 135 from floating therein, as described in the third embodiment.

The track ball unit 110 thus constructed employs the antielectrostatic member which is made of an elastic and conductive wire. Hence, the track ball unit 110 can be assembled with ease, and its component cost is reduced.

As is apparent from the above description, the fourth embodiment, employing the antielectrostatic member which is made of an elastic and conductive wire, can be assembled with ease, and its component cost is reduced.

While a few embodiments of the invention have been described, it is particularly understood that the invention is not limited thereto or thereby; that is, it is obvious to those skilled in the art that various changes or modifications may be made therein without departing from the invention.

What is claimed is:

1. A track ball coordinate data inputting device comprising:
    a coordinate data inputting ball rotatably accommodated in an accommodating portion of a frame;
    a pair of drivers abutted against the ball in two directions forming right angles, the drivers respectively having a rotary shaft supported at a first end thereof, respectively;
    a pair of detecting members for detecting an amount of rotation of the ball, the detecting members including:
        a pair of encoders mounted near said first end of the rotary shafts of the drivers, respectively, so as to minimize movement of said pair of encoders; and
        a pair of photosensors provided for the encoders, respectively, each photosensor having a light-emitting member and a light-receiving member which are confronted with each other through the respective encoder;
    holding means for holding a second end of the rotary shafts; and
    urging means for urging the second end of the rotary shafts for pushing the drivers against the ball, said urging means including a spring member for pushing the drivers against the ball through the holding means,
    wherein said second ends of said rotary shafts are swingable and said first ends of said rotary shafts are relatively fixed to said frame and function as fulcrums for said rotary shafts such that an amount of shifting of respective ones of said encoders relative to said light-receiving members and said light-emitting members is minimized.

2. A track ball coordinate data inputting device as claimed in claim 1, wherein said holding means includes a pair of levers which are coupled to each other and are rotatably mounted on a common supporting shaft formed on the frame.

3. A track ball coordinate data inputting device as claimed in claim 2, wherein the spring member is mounted on the common supporting shaft.

4. A track ball coordinate data inputting device as claimed in claim 1, further comprising:
    a ring-shaped retainer detachably mounted on the frame for preventing the ball from coming off the frame.

5. A track ball coordinate data inputting device comprising:
    a coordinate data inputting ball rotatably accommodated in an accommodating portion of a frame;
    a pair of drivers abutted against the ball in two directions forming right angles, the drivers respectively having a rotary shaft supported at a first end thereof, respectively;
    a pair of detecting members for detecting an amount of rotation of the ball, the detecting members including:

a pair of encoders mounted near said first end of the rotary shafts of the drivers, respectively, so as to minimize movement of said pair of encoders;

a pair of photosensors provided for the encoders, respectively, each photosensor having a light-emitting member and a light-receiving member which are confronted with each other through the respective encoder;

holding means for holding a second end of the rotary shafts;

urging means for urging the second end of the rotary shafts for pushing the drivers against the ball, said urging means including a spring member for pushing the drivers against the ball through the holding means;

a ring-shaped retainer detachably mounted on the frame for preventing the ball from coming off the frame; and a ball holder, made of resin, arranged between the upper periphery of the accommodating portion of the frame and the lower surface of the retainer in such a manner that the ball holder is elastically abutted against the surface of the ball.

6. A track ball coordinate data inputting device as claimed in claim 5, wherein the ball holder includes a plurality of pawls along the inner periphery of said ball holder at a plurality of positions and the pawls abut elastically against the surface of the ball.

7. A track ball coordinate data inputting device comprising:

a coordinate data inputting ball rotatably accommodated in an accommodating portion of a frame;

a pair of drivers abutted against the ball in two directions forming right angles, the drivers respectively having a rotary shaft supported at a first end thereof, respectively;

a pair of detecting members for detecting an amount of rotation of the ball, the detecting members including:

a pair of encoders mounted near said first end of the rotary shafts of the drivers, respectively, so as to minimize movement of said pair of encoders;

a pair of photosensors provided for the encoders, respectively, each photosensor having a light-emitting member and a light-receiving member which are confronted with each other through the respective encoder;

holding means for holding a second end of the rotary shafts;

urging means for urging the second end of the rotary shafts for pushing the drivers against the ball, said urging means including a spring member for pushing the drivers against the ball through the holding means;

a ring-shaped retainer detachably mounted on the frame for preventing the ball from coming off the frame; and an antielectrostatic member, said antielectrostatic member including:

a ring-shaped portion laid along the upper periphery of the accommodating portion of the frame; and a lead-out portion which is extended downwardly from the ring-shaped portion and is brought into contact with a grounding part of a printed circuit board arranged below the frame.

8. A track ball coordinate data inputting device comprising:

a coordinate data inputting ball;

a frame having an accommodating portion for accommodating the ball;

a ring-shaped retainer detachably mounted on the frame for preventing the ball from coming off the frame; and a ball holder arranged between the upper periphery of the accommodating portion of the frame and the lower surface of the retainer in such a manner that the ball holder is elastically abutted against the surface of the ball and such that said ball is held at a center of a space defined by said retainer and so as to prevent floating and shifting of said ball, wherein said ball holder includes a plurality of pawls along the inner periphery of said ball holder for abutting elastically against the surface of the ball.

9. A track ball coordinate data inputting device as claimed in claim 8, wherein the ball holder comprises resin.

10. A track ball coordinate data inputting device as claimed in claim 8, further comprising:

an antielectrostatic member, said antielectrostatic member including:

a ring-shaped portion laid along the upper periphery of the accommodating portion of the frame; and a lead-out portion which is extended downwardly from the ring-shaped portion and is brought into contact with a grounding part of a printed circuit board arranged below the frame.

11. A track ball coordinate data inputting device comprising:

a coordinate data inputting ball;

a frame having an accommodating portion for accommodating the ball;

a ring-shaped retainer detachably mounted on the frame for preventing the ball from coming off the frame;

an antielectrostatic member, said antielectrostatic member including:

a ring-shaped portion laid along the upper periphery of the accommodating portion of the frame; and a lead-out portion which is extended downwardly from the ring-shaped portion and is brought into contact with a grounding part of a printed circuit board arranged below the frame; and a ball holder for holding said ball, said ball holder including a plurality of pawls.

12. A track ball coordinate data inputting device as claimed in claim 11, wherein the antielectrostatic member comprises a bent elastic and conductive wire.

13. A track ball coordinate data inputting device as claimed in claim 7, wherein the antielectrostatic member comprises a bent elastic and conductive wire.

14. A track ball coordinate data inputting device as claimed in claim 10, wherein the antielectrostatic member comprises a bent elastic and conductive wire.

15. A track ball coordinate data inputting device as claimed in claim 6, further comprising:

an antielectrostatic member, said antielectrostatic member including:

a ring-shaped portion laid along the upper periphery of the accommodating portion of the frame; and a lead-out portion which is extended downwardly from the ring-shaped portion and is brought into contact with a grounding part of a printed circuit board arranged below the frame.

16. A track ball coordinate data inputting device as claimed in claim 11, wherein said ball holder arranged between the upper periphery of the accommodating portion of the frame and the lower surface of the retainer such that the ball holder is elastically abutted against the surface of the ball.

17. A track ball coordinate data inputting device as claimed in claim 16, wherein said, said plurality of pawls including a predetermined number of groups of teeth arranged at predetermined angular intervals along an inner periphery of said ball holder, said ball holder further including a plurality of protrusions corresponding in number to said predetermined number of groups of said teeth, said protrusions being respectively positioned between said groups of teeth, said protrusions having a predetermined thickness such that said ball holder is retained by the lower surface of said retainer under pressure.

18. A track ball coordinate data inputting device comprising:

a coordinate data inputting ball rotatably accommodated in an accommodating portion of a frame;.

a pair of drivers abutted against the ball in two directions forming right angles, the drivers respectively having a rotary shaft supported at a first end thereof, respectively;

a pair of detecting members for detecting an amount of rotation of the ball, the detecting members including:

a pair of encoders mounted near said first end of the rotary shafts of the drivers, respectively, so as to minimize movement of said pair of encoders; and a pair of photosensors provided for the encoders, respectively, each photosensor having a light-emitting member and a light-receiving member which are confronted with each other through the respective encoder;

holding means for holding a second end of the rotary shafts;

urging means for urging the second end of the rotary shafts for pushing the drivers against the ball, said urging means including a spring member for pushing the drivers against the ball through the holding means; and a ball holder arranged between the upper periphery of the accommodating portion of the frame and the lower surface of the retainer, for elastically abutting against the surface of the ball, wherein the ball holder includes a plurality of pawls along the inner periphery of said ball holder at a plurality of positions and the pawls elastically abut against the surface of the ball.

19. A track ball coordinate data inputting device as claimed in claim 7, wherein said ring-shaped portion includes first and second portions, said first and second portions being formed by cutting said ring-shaped portion at a point from which said lead-out portion is extended downwardly, thereby said ring-shaped portion having an adjustable diameter, said antielectrostatic member further comprising first and second holding portions.

20. A track ball coordinate dam inputting device as claimed in claim 19, wherein said accommodating portion of said frame includes an inserting/locking portion, said first and second holding portions of said antielectrostatic member holding said inserting/locking portion by elasticity of said ring-shaped portion such that said antielectrostatic member is set along the upper periphery of the accommodating section with said ring-shaped portion exposed.

21. A track ball coordinate data inputting device as claimed in claim 20, wherein said upper periphery includes three locking protrusions for retaining the ting-shaped portion, said ball holder being interposed between the lower surface of the retainer and the upper periphery of said accommodating section for preventing the bail from floating therein.

22. A track ball coordinate data inputting device as claimed in claim 8, wherein said urging means includes a spring member.

* * * * *